United States Patent [19]

Wagner

[11] Patent Number: 4,753,333
[45] Date of Patent: Jun. 28, 1988

[54] TRANSPORT DEVICE FOR ROD-SHAPED MATERIAL

[75] Inventor: Günther Wagner, Reutlingen, Fed. Rep. of Germany

[73] Assignee: Gustav Wagner Maschinenfabrik GmbH & Co. KG, Fed. Rep. of Germany

[21] Appl. No.: 911,261

[22] Filed: Aug. 22, 1986

[30] Foreign Application Priority Data

Aug. 22, 1985 [DE] Fed. Rep. of Germany ....... 3530044

[51] Int. Cl.$^4$ .............................................. B65G 47/00
[52] U.S. Cl. ............................... 198/346.2; 198/468.6; 198/468.7; 198/614
[58] Field of Search ................ 198/346.2, 468.6, 468.7, 198/614, 774, 468.1, 740, 741, 459; 414/745, 750; 72/420, 426; 83/158, 160; 144/242 R, 245 R

[56] References Cited

U.S. PATENT DOCUMENTS

| | | | |
|---|---|---|---|
| 870,592 | 11/1907 | Smitmans | 198/614 |
| 1,139,027 | 5/1915 | George | 198/774 |
| 2,924,132 | 2/1960 | Morgan et al. | 198/774 |
| 3,129,805 | 4/1964 | Krahn et al. | 198/614 |
| 4,150,742 | 4/1979 | Pretsch et al. | 198/459 |

FOREIGN PATENT DOCUMENTS 1231557 9/1960 France ............................... 198/774

Primary Examiner—Joseph E. Valenza
Attorney, Agent, or Firm—Andrus, Sceales, Starke & Sawall

[57] ABSTRACT

Transport device for rod-shaped material (16) for feeding a processing machine, in particular a metal saw, with rake-type supporting rails (2, 10) extending in the feed direction, and with a roller bed (14, 15) located transversely at the front end of the support rails (2, 10). In each case two supporting rails (2, 10) are arranged side-by-side, one of which is fixed and the other is movable along a closed curved track. The movable supporting rails (10) are arranged and their movement is selected in such a manner that their front ends extend through the roller bed (14, 15) and underrun its delivery plane in their lowermost position. At the front ends of the movable supporting rails (10) push-out angles (11) are attached, by means of which remaining rod material (17) can be pushed from the roller bed (14, 15) onto a depository (12), which is located at that side of the roller bed (14, 15) which is opposite the rake-type support rails (2, 10). This makes possible a lateral removal of remaining rod material (17) without interruption of the work cycle.

8 Claims, 3 Drawing Sheets

TRANSPORT DEVICE FOR ROD-SHAPED MATERIAL

BACKGROUND OF THE INVENTION

The invention concerns a transport device for rod-shaped material and particularly for feeding of rod shaped material to a processing machine such as a metal saw. The machine is provided with rake-type support rails extending in the feed direction of movement of the rod-shaped material, and with a roller bed placed transversely at the front end of the supporting rails. One of the rails is fixed and the other is movable along a closed curved track. The movable rail moves in such a manner that the front end extends through the roller bed and underruns the delivery plane in its lowermost position.

Such a transport device is known from DE-A-No. 15 56 584. However, the known transport device does not provide for the removal of the remaining rod shaped material from the roller bed.

Therefore, it is the object of the invention to improve the known transport device in such a way that it is possible, on the one hand, to transport the rod-shaped material to the roller bed in a manner that is both protective of the material surfaces and low in noise, and may include a multiplicity of rod-shaped material of varying shapes and profiles by simple means, and on the other hand to assure that remaining rod shaped material can be pushed from the roller bed as part of a conveying stage of the device without the need for separately driven devices.

SUMMARY OF THE INVENTION

The above object is attained by the invention by means wherein the movable rails have push-out elements attached to the front end. The push-out elements push the remaining rod-shaped material from the roller bed to a delivery unit which is located to one side of the roller bed on the side opposite the rail-support rails hereinafter and more particularly defined and claimed in the dependent claims.

Due to the invention's construction and movement of the rake-type support rails, a rod arriving in front of the roller bed is lifted over the delivery edge of the roller bed during the upward and forward motion of the movable support rails und pulled, or placed, in front of the delivery edge during the downward and backward motion. Die rod delivered to the roller bed is fed to the processing machine, for example, by means of a gripper.

The invention's push-out angles at the front ends of the movable support rails are used to push out a remaining rod in a manner which is protective of the material surfaces and low in noise, which has has been deposited by means of a gripper after the processing operation; the pushing-out operation is initiated when the next rod is to be deposited on the roller bed. The remaining rod material is pushed onto the depository or delivery unit, which is located on the side of the roller bed which is opposite the rake-type support rails. Consequently, the remaining rod material is removed without interruption of the work cycle of the device, i.e. as part of a conveying cycle, without the need for separately driven components such as transverse pushers or similar devices.

According to the invention the material support rails include depository compartments in the form of support prisms, the support surfaces of which should preferably be approximately vertical to one another. In this way, even odd-shaped workpieces can be transported in a manner that protects the surface areas and is low in noise, even if these workpieces extend beyond a depository compartment. The only determinative factor is that the center of gravity of the workpiece to be transported lies within the projection of the conveying depository compartment. The support prisms are suited as well for conveying square or profile stock as for conveying round stock. The diameter of round stock to be transported can be increased considerably—while the dimensions of the support rails remain otherwise unchaged—if the support surfaces of the support prisms extend under an obtuse angle of f.i. 110° toward one another.

A particularly careful treatment of the remaining rod material during its removal from the roller bed is achieved by the conveying or cam shackle unit whereby the pushing-out operation for the remaining rod material to be removed is continued in its final phase in a particularly soft and surface-protective and correspondingly quiet manner, i.e. beyond the effective range of the push-out angles themselves, so that sufficient space is obtained on the roller bed for subsequent rod material with a cross-sectional dimension which is greater than the lift movement of the movable support rails (f.i. lift: 120 mm; cross-sectional dimension of rod material, i.e. in lift direction: 150 mm; the additional space of ca. 35 mm is obtained due to the cam shackle).

Thus the lift of the movable support rails, and therefore the complete device, can be dimensioned, or constructed, smaller than what normally are the largest dimensions, in the direction of the lift motion, of the material to be conveyed or processed.

BRIEF DESCRIPTION OF THE DRAWINGS

In the following, a preferred version of the invention's transport device is described by means of an annexed drawing. The following is shown.

DESCRIPTION OF THE ILLUSTRATED EMBODIMENT

Figure 1:
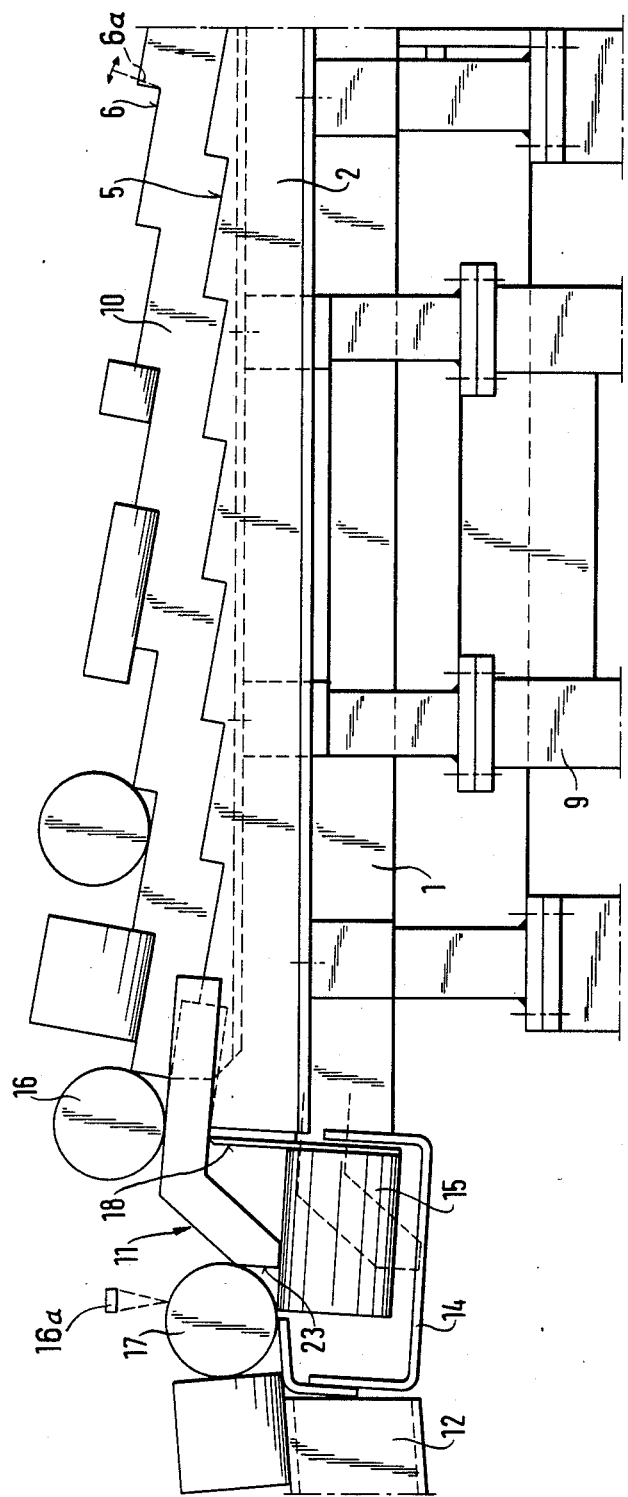
FIG. 1 a schematic lateral view of the device.
Figure 2:
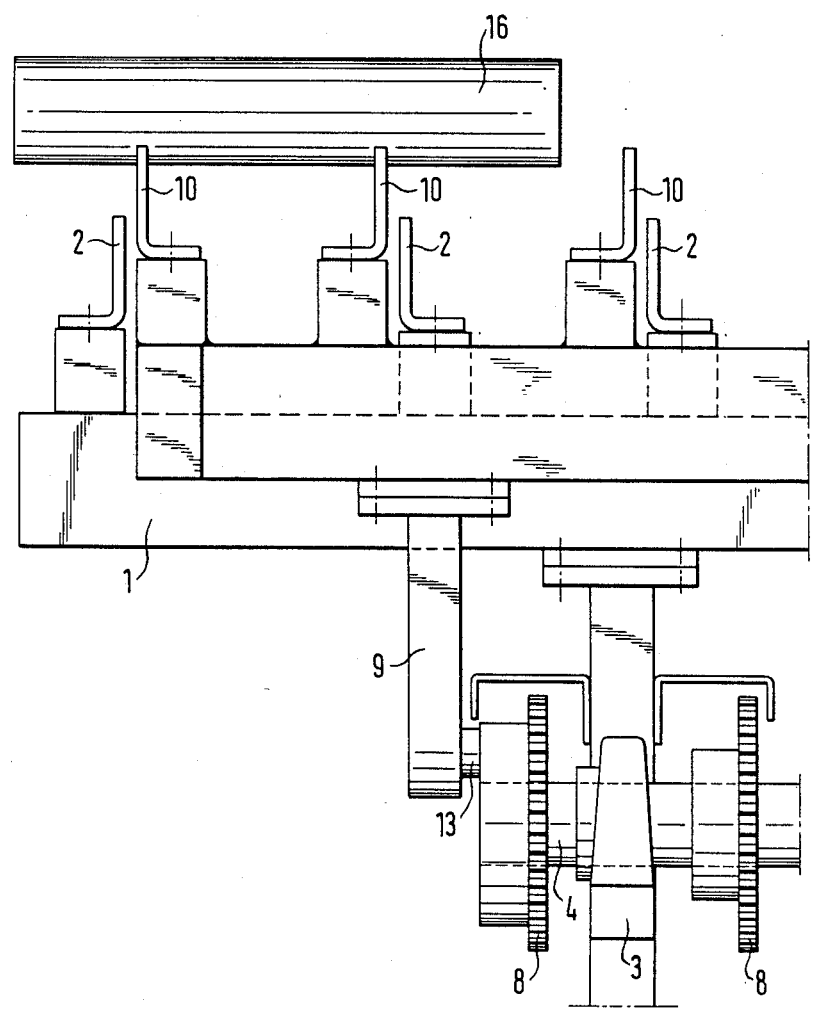
FIG. 2 a schematic front view of the device.

A base support 1 consists of a welded frame, to which primary rake-type material support rails 2 are screwed, which have support prisms 5 that form depository compartments. The depository compartments or the support prisms are defined by generally perpendicularly related surfaces or walls, the generally vertical wall of which is substantially shorter than the generally horizontal wall. The vertical wall, although shown as a 90° relationship, the wall structure may advantageously have an angle of approximately 110° and an obtuse angle of 110°. Further, the one wall such as a generally vertical wall shown at 6a may be made variable for adjustment of the angle to a preferred orientation as shown by the phantom double arrow headed curved line. The this base support 1 a pillow block 3 has also been screwed, in which a drive shaft is supported. A lifting device 9 is driven via chains (not shown) and chain wheels 8 by a general engine, now shown. Like the base support, the lift device 9 consists of a welded frame. To this frame secondary rake-type material support rails (10) have been screwed, which have support prisms 6 that form depository compartments. To the front of each of the secondary material support rails 10 of the lift device 9 a remaining rod push-out angle 11 has been welded, with which the returned remaining rods are pushed onto a remaining rod depository 12 when the next rod is loaded. The lift device 9 is attached to bolts 13, which are supported in the chain wheels 8. A roller bed 14 with loose transport rollers 15 is screwed on the base support 1 and has a delivery edge 18. The remaining rod depository 12 was constructed with an inclination of about or approximately (ca) 20°. According to the loading side, the same number of pieces can be deposited on the remaining rod depository 12. The remaining rod depository 12 may also extend horizontally.

The method of operation of the transport device described above is as follows:

The rod to be processed, in particular to be sawed, is placed in the first support prisms of the material support rails 2. The lifting device 9 moves the placed rods one step further by means of its second material support rails 10. In principle the operational steps continue until one rod 16 lies in the roller bed 14. This is determined by a sensor 16a, which is preferably optical. In the last step the rod 16 lying on the front-most support prism is lifted over the delivery edge 18 and then lowered onto the rollers 15, as in each case the movable support rails 10 extend between two rollers 15. As the movable support rails 10 retract, they pull the rod against the delivery edge 18 and underrun the deposit plane of the rollers. The lowest position of the front-most support prism and of the push-out angle 11 is indicated in FIG. 1 by a dotted line. The rod deposited in the roller bed 14 is fed to the saw by means of the workpiece-gripper.

The remaining rod 17, which has been returned after the sawing operation, is pushed onto the remaining rod depository 12 by the remaining rod push-out angles 11, while the next rod is moved over the roller bed and lowered onto it. Thus, no interruption of the work cycle is necessary during this operation.

Figure 3:
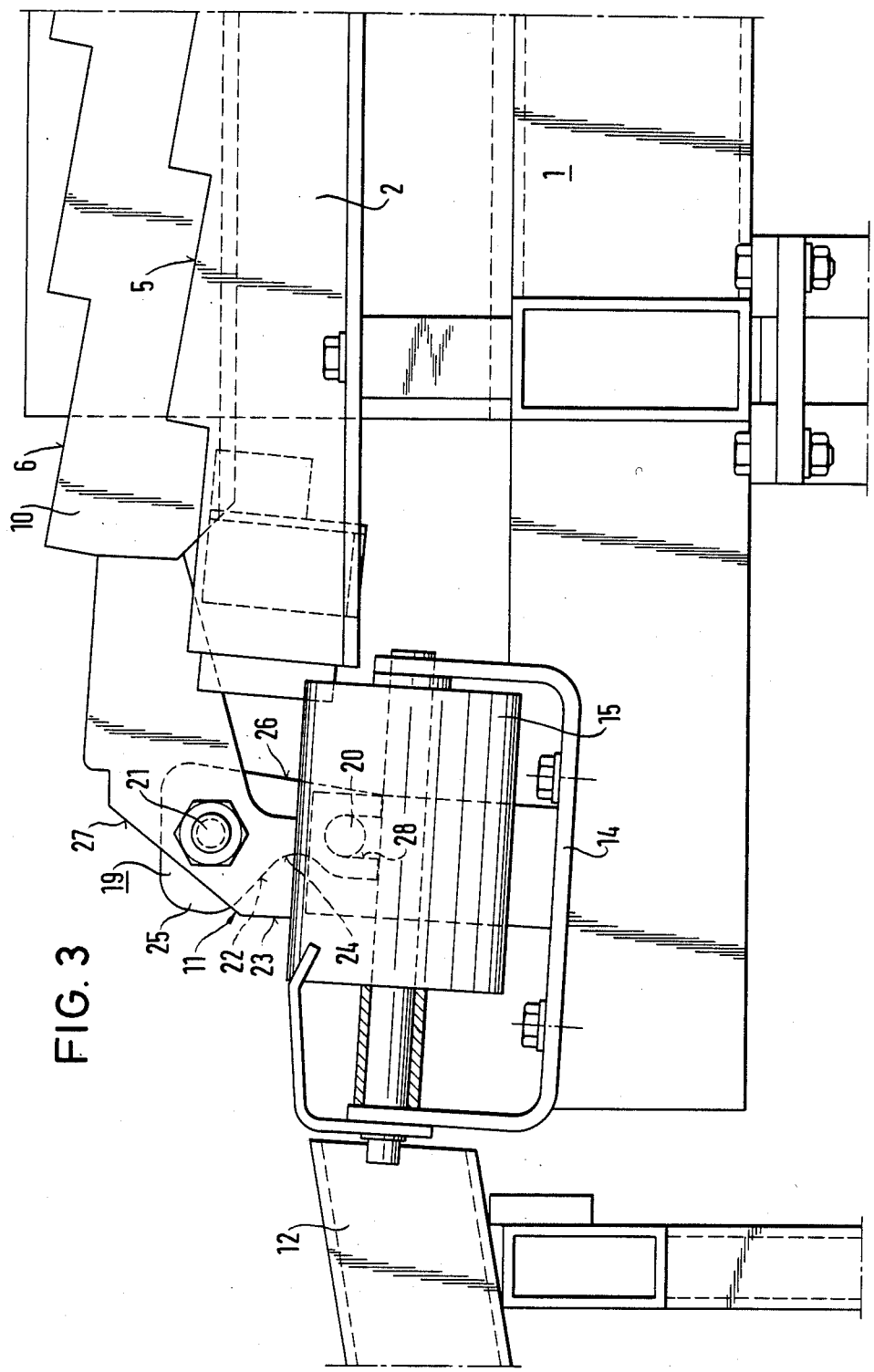
FIG. 3 a detail of the device according to FIGS. 1 and 2 as a schematic lateral view and with increased scale.

Described in the following is an especially preferred arrangement in the area of the push-out angles 11 (FIG. 3).

As can also be seen in FIG. 1, the push-out angles 11 each have a face 27, which points forward, i.e. in the direction of the roller bed 14, 15, and downward; this face ends in a forward frontal area 23 extending approxiamtely vertically to the roller bed plane.

At the front end of the push-out angle 11 constructed in this fashion one each conveying shackle 19 is hinged (hinge 21). This conveying shackle is designed as a cam shackle; in the area of the roller bed 14 the cam shackle is attached to a transverse bolt; it can be turned around the bolt's axis and moved transversely to it. For this purpose the cams hackle 19 has a hole-type recess 28 in the end opposite to the hinge 21, into which recess 28 the transverse bolt 20 extends. In this manner a curved track is defined for the cam surface 22 of the conveying or cam shackle 19; during the end phase of the push-out movement of the movable support rails 10 this curved track extends beyond the inclined face 27 and the upright frontal area 23 of the push-out angles 11 assigned to the movable support rails 10; this causes the push-out operation of the remaining rod material, which was initiated by the push-out angles 11, to continue softly, without damaging the material surface, and without interruption. In addition, the cam surface 22 of the cam shackle 19 is constructed with respect to the face contour of the push-out angles 11 in such a manner that it stands back from the respective push-out angles 11 until the end phase of the push-out operation. The cam surface 22 thus constitutes a sort of moving extension of the push-out angles 11. This also assures that the remaining rod material is still being actively pushed from the roller bed when the upright frontal area 23 of the push-out angle 11 has already dipped below the roller bed plane. The result of the described cam shackles 19 is that, as compared with the lift of the movable support rails 10, greater space is created for subsequent rod material on the roller bed 14, so that larger rod material can be conveyed in the lift direction without colliding with the remaining rod material. Concretely, the cam surface 22 has, beginning at the support in the area of the transverse bolt 20, a recess 24, which connects to a stud 25 extending at the push-out angle 11 in the area of the hinge 21. The face 26 of the cam shackle 19 located opposite this cam surface 24 is straight. The nose-type stud 25 of the cam shackles 19 moves forward across the inclined face 27 and the upright frontal area 23 of the push-out angles 11 during the the end phase of the push-out operation. The recess assures that otherwise the cam surface 22 stands back from the face 27 of the push-out angles 11, so that remaining rod material to be pushed out is not lifted up by the cam shackle 19 during the push-out operation.

The contour of the cam surface 22 (FIG. 3) permits a non-binding, and thus smooth and surface-protecting, lateral removal of remaining rod material to the depository 12 described above.

I claim:

1. Transport device for rod-shaped material (16) for feeding a processing machine such as a metal saw comprising rake-type supporting assembly (2,10) extending from a back end to a front end in the feed direction, a delivery unit to one side of said assembly, a roller bed (14, 15) mounted transversely at the front end of the supporting assembly and having an upper delivery plane for transfer of the rod-shaped material to deliver unit, said supporting assembly including a plurality of pairs of first and second support rails (2, 10) with the rails of each pair arranged side-by-side, one of said rails being fixed and the other of said rails being movable along a closed curved path, each movable support rail (10) being constructed and located with the front end extending through the roller bed (14, 15) and movable beneath said delivery plane in a lowermost position, the front end of each of said movable support rails (10) having an inclined push-out angled portion (11) for pushing work from the roller bed (14, 15) onto said delivery unit (12), wherein a conveying shackle (19) is hinged to the front end of each movable support rail (10) in the push-out angled portion (11), said conveying shackle extending from the hinge (21) to an outer end, means adjacent said roller bed (14, 15) to support the outer end of the shackle for removing rod material from said roller bed.

2. The transport device of claim 1 wherein said outer end of the shackle is supported for sliding longitudinally of said roller bed for removing rod material from said roller bed.

3. The transport device according to claim 1, wherein each conveying shackle (19) is constructed as cam shackles coupled to said movable support rails (10) and responsive to the movable support rail moving from a raised position into a lowered position with respect to the roller bed (14, 15) the cam surface (22) of the conveying shackle (19) seizes rod material (17) to be removed from the roller bed (14, 15) and pushes the rod material from the roller bed (14, 15).

4. The transport device according to claim 1 wherein said push-out angled portion has an inclined face extended forward in the direction of the roller bed (14, 15), and downwardly to a frontal portion (23) extending approximately vertically to the roller bed place and said cam surface (22) of the cam shackle (19) being constructed and arranged opposite the face and the frontal area of the push-out angles (11) and moved to extend across said face and frontal area of the push-out angles (11) in response to movement of the push-out angles and operable to push out the remaining rod material (17).

5. The transport device of claim 4 wherein said rails include support prisms, each of said prisms including supporting surfaces located approximately vertical to one another.

6. The transport device of claim 5 wherein said support prisms include supporting surfaces enclosing an obtuse angle of substantially ca. 110°.

7. The transport device of claim 5 characterized by the fact that the angle between the supporting surfaces of the support prisms (5,6) is in each case variable.

8. The transport device of claim 1 wherein said roller bed (14, 15) is equipped with a sensor for sensing the presence of rod material in the roller bed (14, 15) and a drive means for the movable support rails (10) and responsive to the output of said sensor.

* * * * *

UNITED STATES PATENT AND TRADEMARK OFFICE
CERTIFICATE OF CORRECTION

PATENT NO. : 4,753,333
DATED : June 28, 1988
INVENTOR(S) : Gunther Wagner

It is certified that error appears in the above-identified patent and that said Letters Patent is hereby corrected as shown below:

Col. 1, line 53, after "which has" delete "has"; Col. 2, lines 10-11, delete "unchaged" and substitute therefor ---unchanged---; Col. 2, line 62, delete "The" and substitute therefor ---To---; Col. 3, lines 47-48, delete "approxiametely" and substitute therefor ---approximately---; Col. 3, line 55, delete "hackle" and substitute therefor ---shackle---; Col. 4, line 22, after "during" delete "the"; Col. 5, line 8, delete "place" and substitute therefor ---plane---.

Signed and Sealed this

Twenty-ninth Day of August, 1989

*Attest:*

DONALD J. QUIGG

*Attesting Officer*  *Commissioner of Patents and Trademarks*